United States Patent [19]
Finney et al.

[11] Patent Number: 5,570,356
[45] Date of Patent: Oct. 29, 1996

[54] HIGH BANDWIDTH COMMUNICATIONS SYSTEM HAVING MULTIPLE SERIAL LINKS

[75] Inventors: Damon W. Finney; Michael O. Jenkins, both of San Jose, Calif.; Michael J. Rayfield, Tucson, Ariz.

[73] Assignee: International Business Machines Corporation, Armonk, N.Y.

[21] Appl. No.: 486,541

[22] Filed: Jun. 7, 1995

[51] Int. Cl.⁶ .............................. H04J 3/06; H04Q 11/04
[52] U.S. Cl. ..................... 370/85.9; 370/99; 370/100.1; 370/112; 375/260; 371/37.1; 341/100; 341/101
[58] Field of Search ...................... 370/77, 84, 85.9, 370/99, 100.1, 112; 375/260, 354; 371/30, 2.1, 37.1; 395/306, 307; 341/100, 101, 111

[56] References Cited

U.S. PATENT DOCUMENTS

| | | | |
|---|---|---|---|
| 4,703,475 | 10/1987 | Dretzka et al. | 370/60 |
| 4,775,987 | 10/1988 | Miller | 375/260 |
| 4,991,172 | 2/1991 | Cidon et al. | 370/85.9 |
| 5,065,396 | 11/1991 | Castellano et al. | 370/84 |
| 5,231,649 | 7/1993 | Duncanson | 375/260 |
| 5,241,541 | 8/1993 | Farrell et al. | 370/94.1 |
| 5,251,210 | 10/1993 | Mann et al. | 370/84 |
| 5,293,378 | 3/1994 | Shimizu | 370/112 |

FOREIGN PATENT DOCUMENTS

WO9313609-A1 7/1993 European Pat. Off. .
1-148645 6/1989 Japan .

*Primary Examiner*—Hassan Kizou
*Attorney, Agent, or Firm*—Leslie G. Murray; Jenkens & Gilchrist, P.C.

[57] ABSTRACT

A data communication system includes a phase splitting circuit to split a high speed parallel data word into a number of individual parallel data bytes, a byte multiplexor for each of the phases of a phase splitting circuit, encoding and serialization circuits for converting each byte such as an 8-bit byte to an encoded form suitable for serial transmission such as by employing the Widmer et al. 8-bit/10-bit code, transmitting each encoded byte across one of a number of serial transmission links to a receiving device where the data is deserialized and decoded to recover the original byte which is then synchronized by a byte synchronization circuit. The byte synchronization circuits are then coupled to a word synchronization circuit where the original high bandwidth data word is recovered and transmitted on an internal high speed parallel bus within the receiving device.

8 Claims, 8 Drawing Sheets

TRANSMITTER - BLOCK DIAGRAM

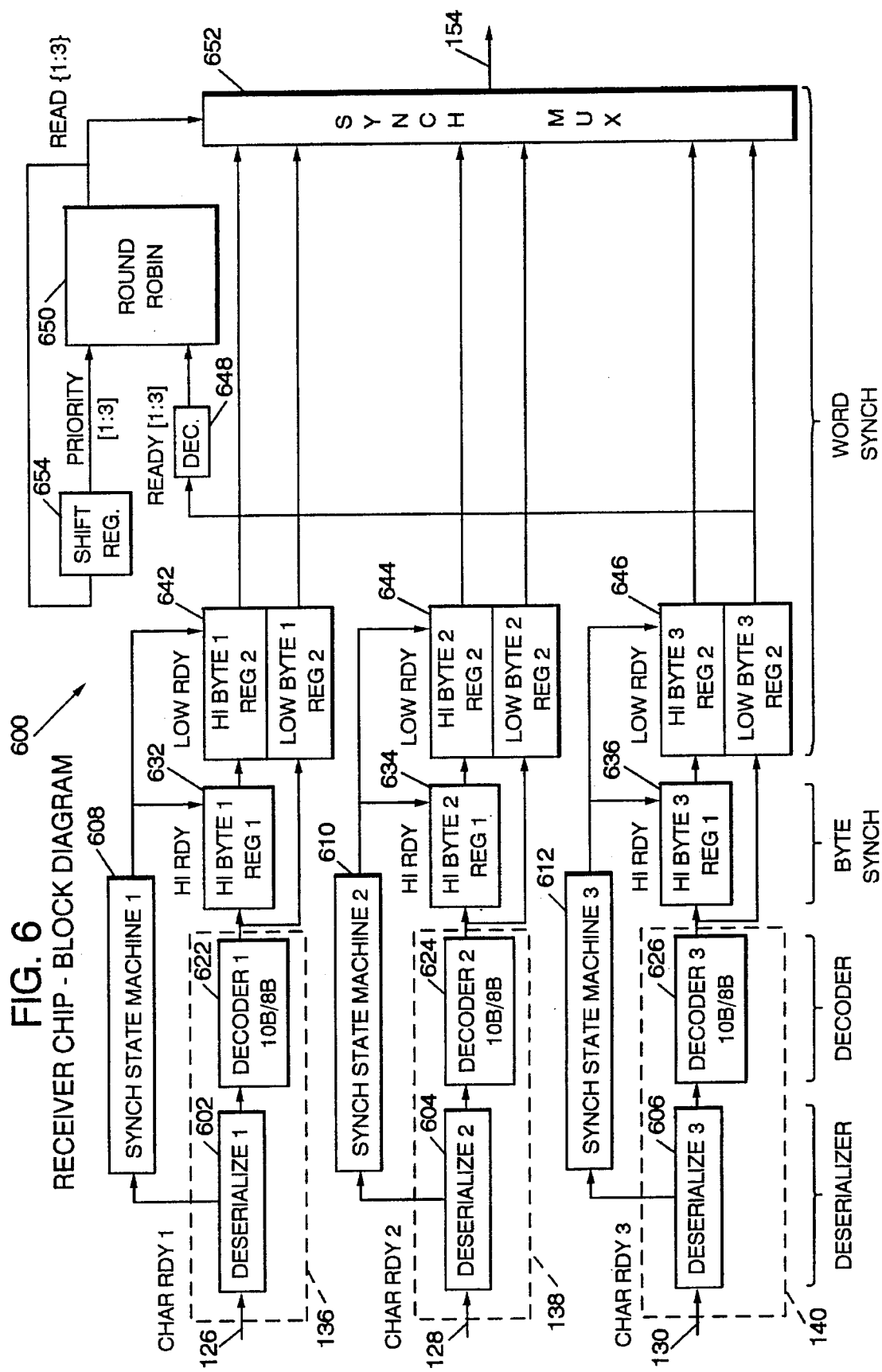

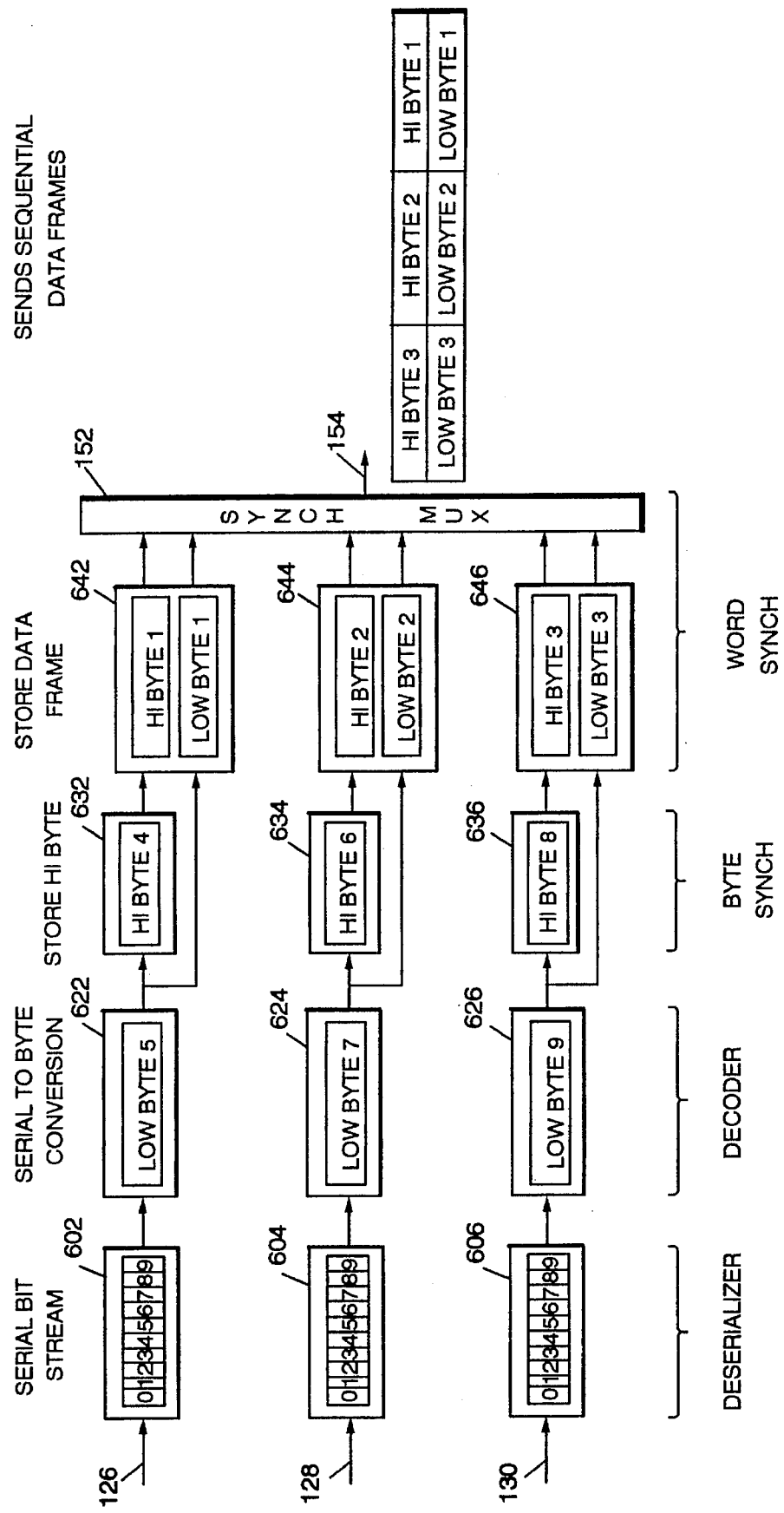

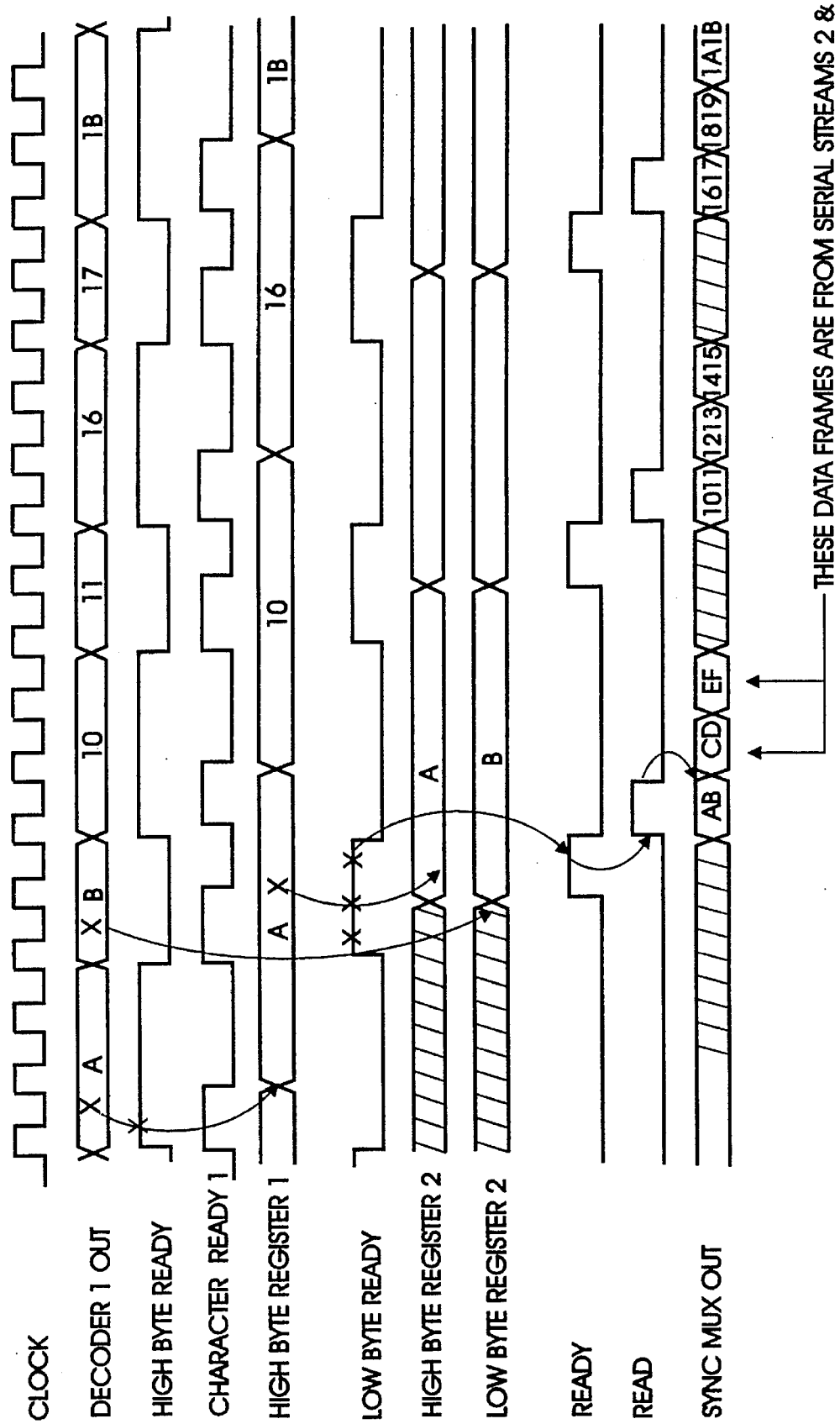

PHASE GENERATION
STATE MACHINE

SYNC STATE MACHINE 5,570,356

HIGH BANDWIDTH COMMUNICATIONS SYSTEM HAVING MULTIPLE SERIAL LINKS

BACKGROUND OF THE INVENTION

1. Field of the Invention

The present invention relates to data communications systems, and more particularly to high bandwidth data communication systems employing multiple serial links.

2. Prior Art

U.S. Pat. No. 5,065,396 teaches an inverse multiplexor/ demultiplexor system which demultiplexes a data input signal at a first data rate into a plurality of second lower data rate subsectional signals where each sub sectional signal is provided with a periodic synchronization marker and includes a data rate which is less than the channel data rate used to transmit the subsectional signal to a remote terminal. Programmable multiplexors operate to take one or more subsectional signals that are clock synchronized to a programmable multiplexor clock and a rational fraction of the channel data rate and map contiguously assigned time slots in a capacity domain frame for each subsectional signal to time slots of a time domain frame format using a two step or three step digit reverse technique.

Although the patent teaches a technique for transmitting high bandwidth data over lower bandwidth transmission media, the patent requires insertion of periodic synchronization markers and a mapping of contiguously assigned time slots in a capacity domain frame for each subsectional signal.

U.S. Pat. No. 5,241,541 teaches a first time division multiplex interface for an integrated data link controller.

Although the patent does deal with time division multiplexing for data transmission, it does not teach an efficient high bandwidth communication protocol using multiple serial links as does the present invention.

U.S. Pat. No. 5,251,210 teaches method and apparatus for transforming low bandwidth telecommunications channels into a high bandwidth telecommunications channel. The patent teaches a system employing a number of relatively low bandwidth channels which are combined to form a high bandwidth channel and wherein transmission time delays across the low bandwidth channels is equalized at the receiving station through the use of alignment monitors which detect alignment signals to determine delay between different ones of the low bandwidth channels.

Although the patent generally deals with the use of low bandwidth channels to transmit high bandwidth information, the patent employs a complex alignment system to measure and compensate for varying delays between different ones of the low bandwidth channels.

Published European patent application abstract WO9313609-A teaches a system for interconnecting data terminals through a switched digital network using inverse multiplexing to split high bandwidth data stream into multiple signals for transmission over separate narrow bandwidth channels. The system of the publication generally refers to a packet switching system in which a serial packet stream on a high speed link is divided into multiple packet streams over multiple lower speed links where packets are specifically assigned time slots.

The published application does not teach nor suggest Applicants' invention which provides the simple and cost effective high bandwidth communications protocol over multiple serial data links.

Published unexamined Japanese patent application JP01-148645 teaches a control system for controlling wheel slip in a driven wheel vehicle. The abstract incidently discloses that data from the wheels are sent to a serial data transmitting circuit from which data are sent by serial transmission to a serial data receiving means by means of a time division multiplex communications system.

Although the published application abstract teaches generally serial data transmission and time division multiplexing, it does not teach Applicant's invention of a high bandwidth communications protocol employing multiple serial data links.

SUMMARY OF THE INVENTION

Therefore, it is an object of the present invention to achieve high bandwidth data transmission with great skew tolerance employing lower clocking frequencies with less circuitry dissipating lower power than has been available in the prior art.

Accordingly, a data communication system includes a phase splitting circuit to split a high speed parallel data word into a number of individual parallel data bytes, a byte multiplexor for each of the phases of a phase splitting circuit, encoding and serialization circuits for conveying each byte such as an 8-bit byte to an encoded form suitable for serial transmission such as by employing the Widmer et al. 8-bit/10-bit code, transmitting each encoded byte across one of a number of serial transmission links to a receiving device where the data is deserialized and decoded to recover the original byte which is then synchronized by a byte synchronization circuit. The byte synchronization circuits are then coupled to a word synchronization circuit where the original high bandwidth data word is recovered and transmitted on an internal high speed parallel bus within the receiving device.

It is a feature of the present invention that high bandwidth data may be efficiently transmitted over multiple serial links at relatively low cost employing fewer circuits than in the prior an with lower power dissipation.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the preset invention, and the advantages thereof, reference is now made to the following descriptions taken in conjunction with the accompanying drawings, in which:

FIG. 6 is a block diagram of a receiver circuit in accordance with the present invention.

FIG. 7 is a data flow diagram of the receiver circuit of FIG. 6, in accordance with the present invention.

FIG. 8 is a timing diagram of the receiver circuit of FIG. 6, in accordance with the present invention.

DETAILED DESCRIPTION OF A PREFERRED EMBODIMENT OF THE INVENTION

Figure 1:
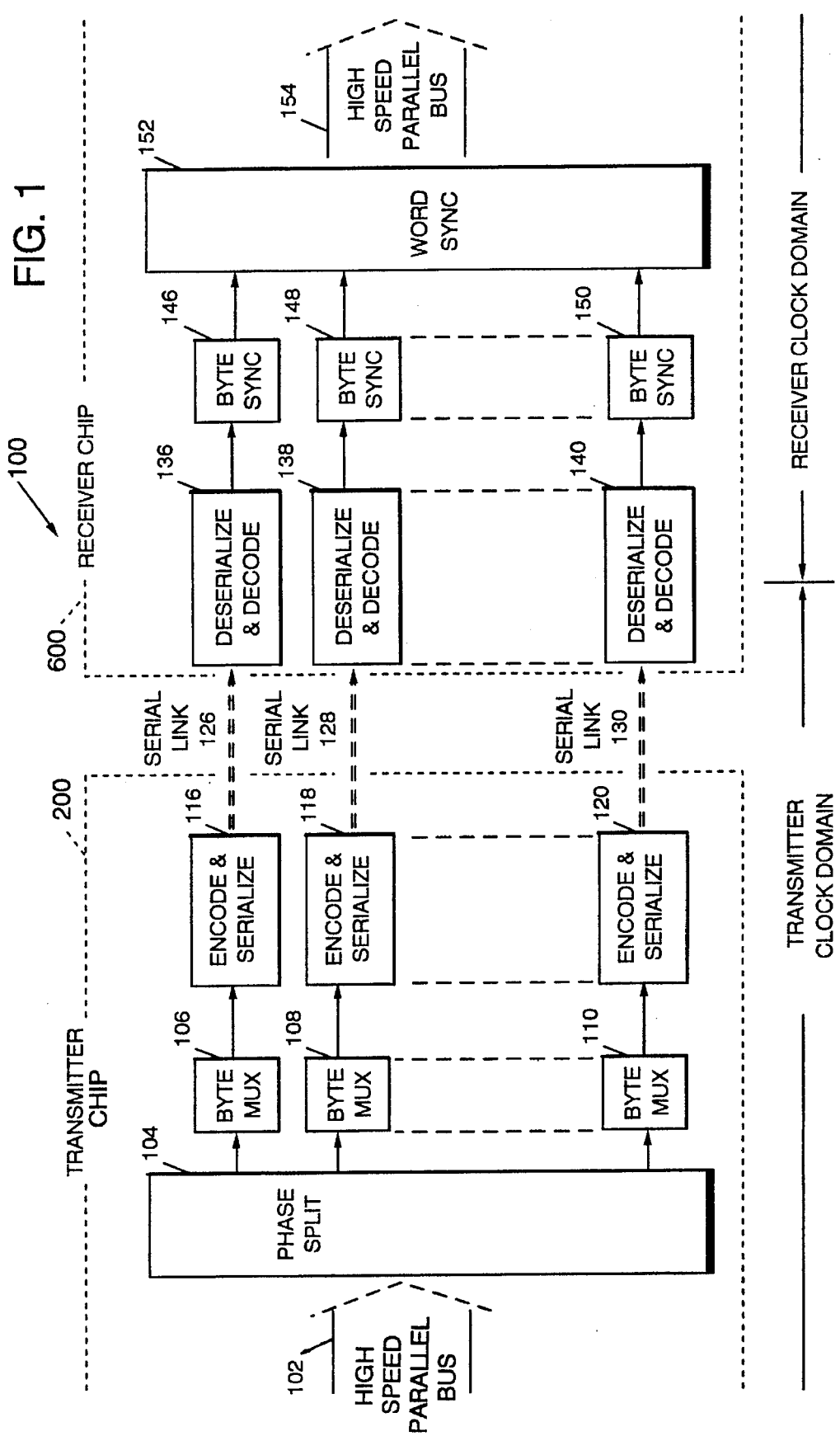
FIG. 1 is a block diagram of the data communication system in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring now to FIG. 1, a data transmission system in accordance with the present invention will be described.

Data transmission system 100 communicates with a high speed parallel bus 102 which may have a width of any preselected number of bytes such as 2, 4, 8, etc. A phase splitting circuit 104 selects a portion of the parallel data on parallel bus 102 as a phase to be delivered to one of a number of byte multiplexors 106, 108, 110, etc. The outputs from the byte multiplexors 106, 108 and 110 are connected to encoder and serializer circuits 116, 118, 120, respectively, in which the byte, nominally eight bits in length, is encoded using well-known encoding techniques such as the Widmer et al. 8 bit/10 bit encoding technique. The encoded data is then serialized and output to serial links 126, 128, 130, respectively. At the receiving end of serial links 126, 128, 130, the data is recovered and deserialized to parallel form and the 10-bit representation of each byte is decoded to recover the original 8-bits which are then output to byte synchronizers 146, 148, 150, in which bytes are collected and placed in proper order for transmission to word synchronizer 152 which then collects outputs from all byte synchronizers 146, 148 and 150 to reassemble the high bandwidth parallel word which is then transmitted internally on high speed parallel bus 154.

Figure 2:
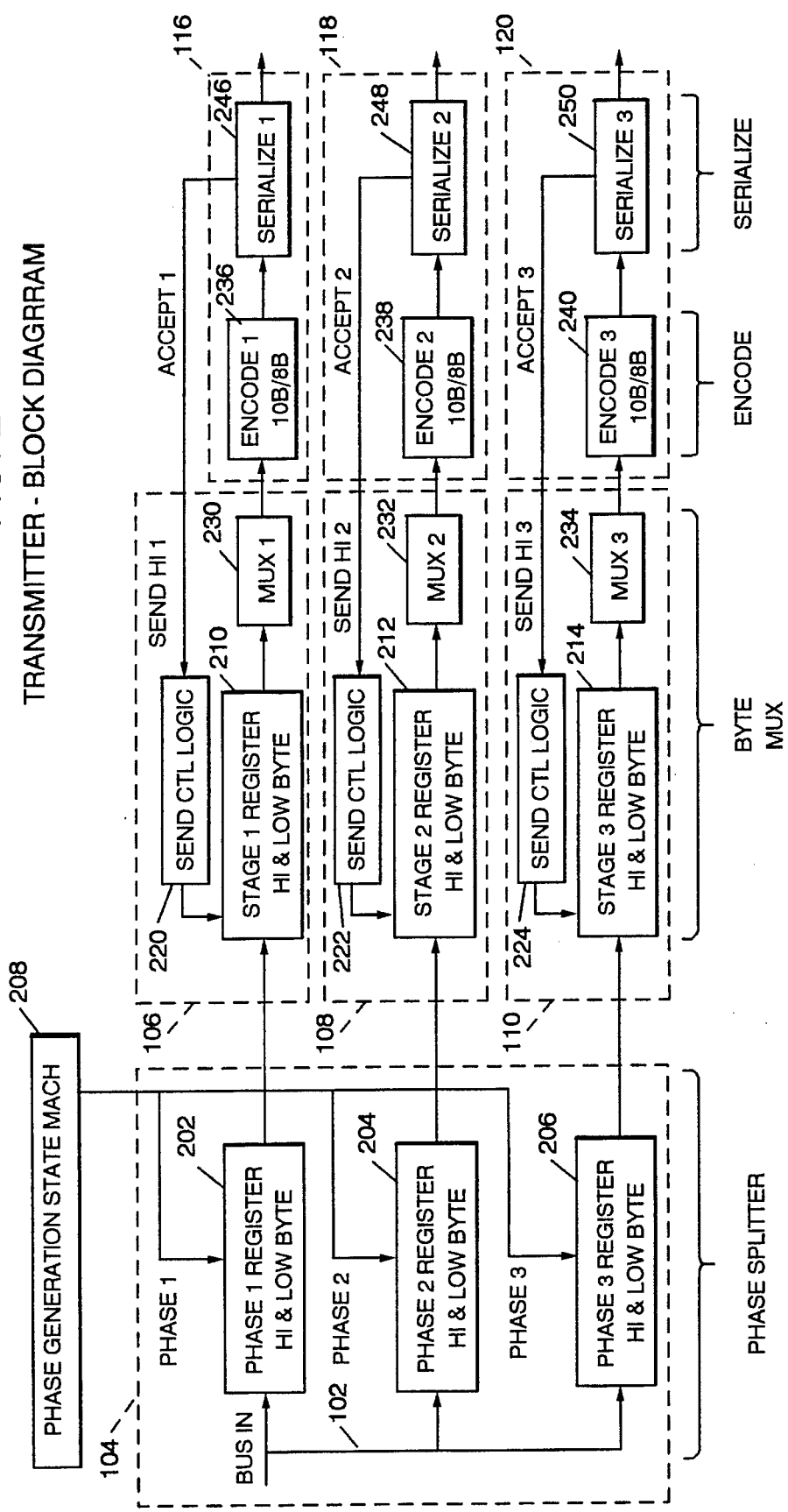
FIG. 2 is a block diagram of a transmitter circuit in accordance with the present invention.

Referring now to FIG. 2, transmitter 200 will be described in greater detail.

Data is input to transmitter 200 on high speed parallel bus 102 (see FIG. 1). Phase splitter 104 includes a number of phase registers 202, 204 and 206, respectively, wherein each phase register stores a number of bytes as indicated by the byte width of high speed parallel bus 102. In the preferred embodiment described herein, each phase register 202, 204 and 206 will store two bytes each.

Figure 4:
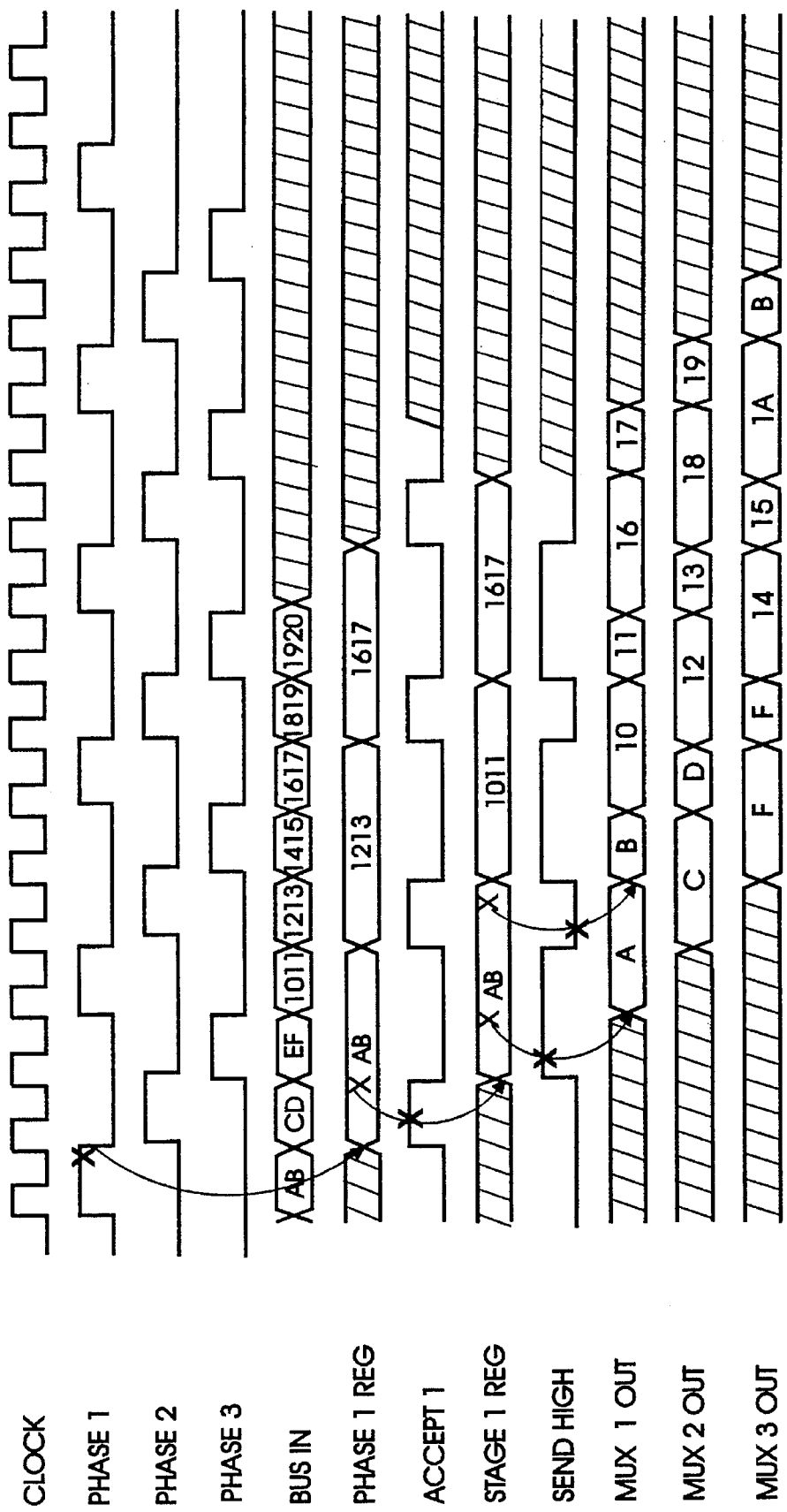
FIG. 4 is a timing diagram of the transmitter circuit of FIG. 2, in accordance with the present invention.
Figure 5:
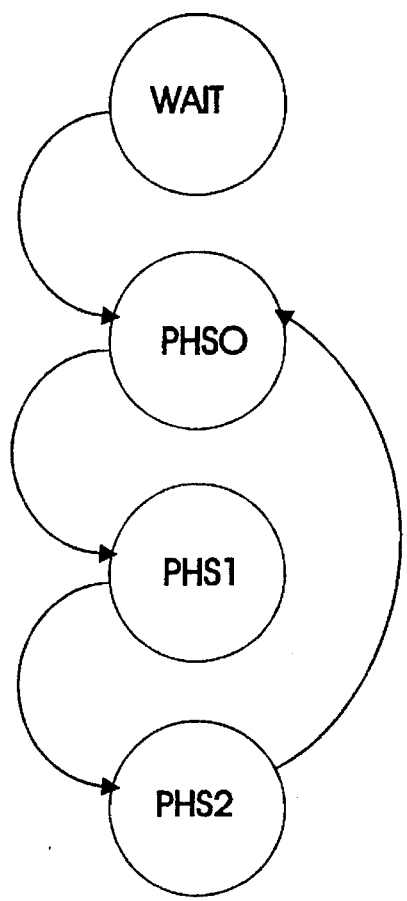
FIG. 5 is a state diagram of a phase generation state machine of FIG. 2, in accordance with the present invention.
Figure 9:
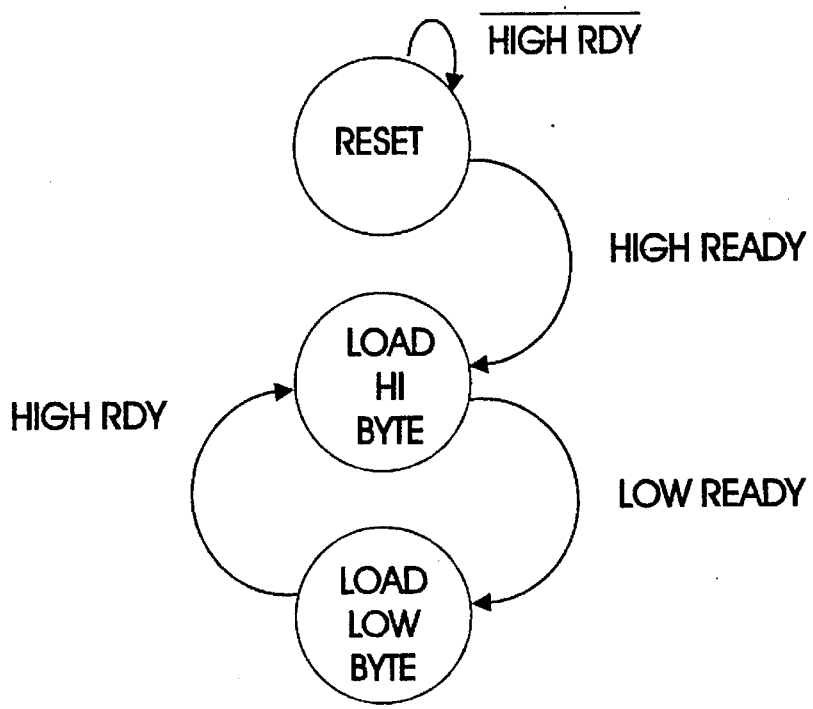
FIG. 9 is a state diagram of a synchronization state machine of FIG. 6 in accordance with the present invention.

The gating of data from high speed parallel bus 102 to phase registers 202, 204 and 206 is controlled by phase generation state machine 208 which in the preferred embodiment described herein includes three operational phases and a wait state as shown in FIG. 5. The timing of phases 1, 2 and 3 which control registers 202, 204 and 206, respectively, is shown in the timing diagram of FIG. 4.

The outputs of phase registers 202, 204 and 206 are connected to inputs of byte multiplexors 106, 108 and 110, respectively. Each byte multiplexor 106, 108 and 110 includes a register capable of storing two bytes, the output of the register being connected to a mutliplexor and send control logic 220, 222, 224, for controlling the transmission of data on a byte basis from registers 210, 212 and 214, respectively, to multiplexors 230, 232 and 234, respectively. The send control logic 220, 222 and 224, respectively, is controlled by an input from serializers 246, 248 and 250, respectively. The outputs of byte multiplexors 106, 108 and 110, respectively, are connected to inputs of encoders 236, 238 and 240, respectively, wherein a standard Widmer et al. 8-bit/10-bit encoding is performed to provide a data string of 10 encoded bits for each 8-bit byte to serializers 246, 248 and 250, respectively. The outputs of serializers 246, 248 and 250 are connected to the serial transmission links 126, 128 and 130, respectively (see FIG. 1).

Figure 3:
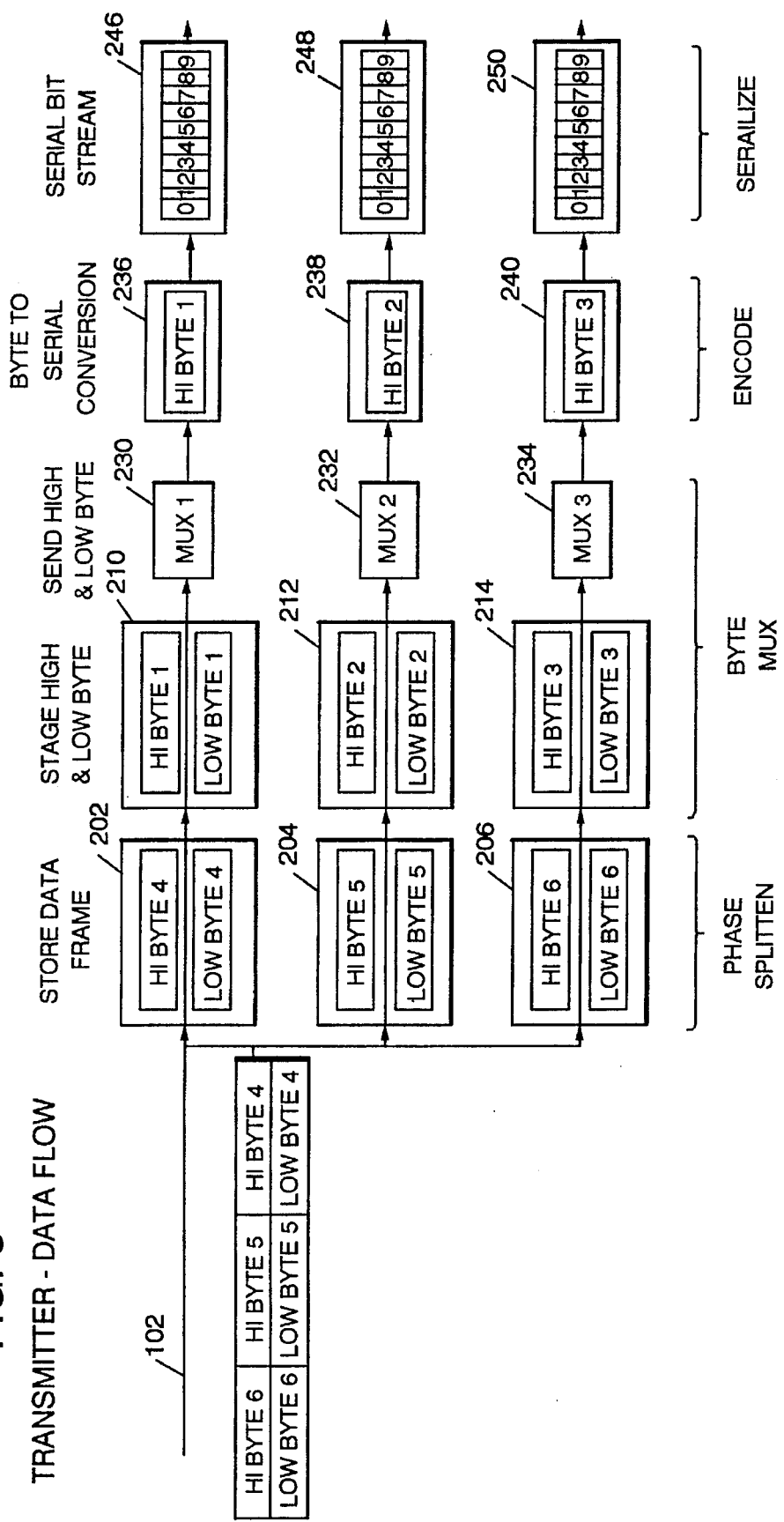
FIG. 3 is a data flow diagram of the transmitter circuit of FIG. 2, in accordance with the present invention.

Referring now to FIG. 3, the data flow of transmitter 200 will be briefly described.

As discussed above, data is transmitted to phase splitter 104 by high speed parallel bus 102.

In the preferred embodiment, the high speed parallel bus is 2 bytes wide. However, it should be noted that the present invention would accommodate any appropriate byte width on high speed parallel bus 102 with appropriate scaling of the number of registers, multiplexors, encoders and serializers, as required.

In the snapshot of time represented by FIG. 3, the high byte and the low byte representing phase 1 are stored in registers 210, the high byte and the low byte representing phase 2 are stored in registers 212 and the high byte and the low byte representing phase 3 are stored in registers 214. These bytes are followed by the high and low bytes for phase 4 which are stored in registers 202, the high byte and the low byte for phase 5 stored in registers 204, and the high byte and low byte for phase 6 are stored in register 206.

It should also be noted that at the time of the snapshot of FIG. 3, the high and low bytes for phases 4, 5 and 6 are still active on high speed parallel bus 102. The high and low bytes are multiplexed one byte at a time from registers 210, 212 and 214 by multiplexors 230, 232 and 234, respectively, to encoders 236, 238 and 240, respectively. As shown in FIG. 3, the high bytes for phase 1, 2 and 3 have been multiplexed by multiplexors 230, 232 and 234 into encoders 236, 238 and 240, respectively. The encoded data is then serialized by serializers 246, 248 and 250, respectively, for transmission on serial links 126, 128 and 130, respectively.

As described above, the timing of gating signals from the phase generation state machine 208 controlling registers 202, 204 and 206 for phase 1, phase 2 and phase 3 is shown in the timing diagram of FIG. 4.

Phase 1, Phase 2 and Phase 3 gates the data from bus in to registers 202, 204 and 206.

Accept 1, Accept 2 and Accept 3 gates the outputs of registers 202, 204 and 206 respectively to byte synch registers 210, 212 and 214, respectively, in sequence, as shown in FIG. 4. The outputs of phase registers 202, 204 and 206, are then presented to inputs of stage registers 210, 212 and 214, respectively, and stored in stage registers 210, 212 and 214 when the accept signal is raised by serializers 246, 248 and 250, respectively, when the serializers have received a byte of data. The accept 1 signal causes send control logic 220, 222 and 224, respectively, to generate the send high 1, send high 2 and send high 3 signals to registers 210, 212 and 214, respectively at the appropriate times such that the high byte stored in each of the byte synch registers 210, 212 and 214 are gated to byte multiplexor 230, 232 and 234, respectively. When the accept 1 signal drops, the low byte from registers 210, 212 and 214, respectively, is sent to multiplexor 230, 232 and 234, respectively, to encoders 236, 238 and 240, respectively, for encoding as discussed above.

As described above, the encoded data is then serialized and transmitted across the serial transmission medium to receiver 600.

Referring now to FIG. 6, the structure and operation of receiver 600 will be described in greater detail.

The purpose of the receiver 600 is to receive multiple serial bit data streams and convert each of the serial bit streams into frames, having anywhere from 2 to 16 bytes per frame, and order the frames in a sequential manner. Deserializers 602, 604 and 606 convert serial bit streams received from transmission media 126, 128 and 130, respectively, into bytes. Each byte has a length of 10 bits since the receive bits are in an encoded form having been encoded using the Widmer et al. 8-bit/10-bit encoding technique. Each byte is decoded by decoder 622 connected to the output of deserializer 602, 624 connected to the output of deserializer 604 and 626 connected to the output of deserializer 606. The respective outputs of decoders 622, 624 and 626 are connected to inputs of byte registers 632, 634 and 636, respectively.

Although the encoding and decoding techniques used in the preferred embodiment of the present invention are the Widmer et al. 8-bit/10-bit encoding/decoding technique, it is understood by those skilled in the art that any suitable encoder/decoder technique could be used without departing from the invention.

Deserializer 602, 604 and 606 presents the high order byte of each 2-byte frame for three clock cycles and the low order byte for two clock cycles, respectively (see FIG. 8, a timing diagram of receiver 600 for more detail). When each byte is presented from deserializers 602, 604, 606 to decoder 622, 624, 626, respectively, deserializers 602, 604 and 606 set a character ready signal on as an input to synchronization state machines 608, 610, and 612, respectively. Character ready causes high byte ready and low byte ready to toggle. See FIG. 8 wherein the high byte ready signal is up for three clock cycles and then down for two clock cycles indicating that the high byte is available for three clock cycles and the low byte is available for two clock cycles as discussed above. When synchronization state machines 608, 610 and 612 receive the character ready signal, indicating a high order byte of an incoming frame is available, the high order byte is loaded into registers 632, 634 and 636, respectively, gated by the high byte ready signal from synchronization state machines 608, 610, and 612, respectively. When the next character ready is asserted, indicating a low order byte from each frame is available from deserializer 602, 604 and 606, respectively, synchronization state machines 608, 610 and 612, respectively, generate a low byte ready signal which causes the high byte to be gated from registers 632, 634 and 636, respectively, to the high order byte portion of registers 642, 644 and 646, and the low order byte to be gated into the low order portions of registers 642, 644 and 646 from decoders 622, 624 and 626, respectively. The timing sequence of the gating as described above is shown in FIG. 8.

When both high and low order bytes are loaded into registers 642, 644 and 646, a ready line is generated by decoder 648 which provides an input for round robin circuit 650 which controls the reading of data from registers 642, 644 and 646 to synchronization multiplexor 652, which then presents the data to high speed parallel bus 154 (see FIG. 1). Round robin circuit 650 controls the reading of registers 642, 644 and 646 in sequence by the read signal which allows one of the three registers to be read at any time. See the ready and read signal representations in the timing diagram of FIG. 8 for further detail. Shift register 654 has an input connected to the output of round robin circuit 650 such that if a ready line is active from each of registers 642, 644 and 646, that register 642 representing a first frame would be read first and then register 644 representing a second frame would be read and then 646 representing a third frame would be read in sequence.

Referring now to FIG. 7, the receiver data flow will be described. As discussed above, data arrives at deserializer 602, 604 and 606 from transmission media 126, 128 and 130, respectively. The data in 10-bit bytes is then decoded by decoders 622, 624 and 626, respectively. The high byte of each 2-byte frame is stored in high byte registers 632, 634 and 636 and then gated to registers 642, 644 and 646, respectively, on a next cycle when a low byte of each frame is gated to a low order portion of registers 642, 644 and 646, respectively. The outputs of registers 642, 644 and 646 are connected to inputs to synchronization multiplexor 152 which selects one frame from each phase in a proper sequence so that the data transmitted on high speed parallel bus 154 is a sequence of 2-byte frames with frame 1 being gated first on the bus followed by frame 2 and then frame 3.

As described above, synchronization state machine 608 has three states. There is a reset state, a load high order byte state and a load low order byte state. When a first character ready signal is raised, the state machine moves to the high byte ready and the load high order byte signal is raised. When the next character ready is received, the high byte ready signal drops, the low byte ready signal is raised and the low order byte is then gated. This process continues until all data has been processed and transmitted to high speed data bus 154.

With the foregoing hardware in mind, it is possible to explain the process-related features of the present invention. To more clearly describe these features of the present invention, discussion of other conventional features is omitted as being apparent to those skilled in the art. It is assumed that those skilled in the art are familiar with a multiuser, multiprocessor operating system, and in particular with the requirements of such an operating system for memory management including virtual memory, processor scheduling, synchronization facilities for both processes and processors, message passing, ordinary device drivers, terminal and network support, system initialization, interrupt management, system call facilities, and administrative facilities.

Although the present invention and its advantages have been described in detail, it should be understood that various changes, substitutions and alterations can be made herein without departing from the spirit and scope of the invention as defined by the appended claims.

What is claimed is:

1. A data communications system, comprising:

first circuit means for dividing an input data signal into a plurality of phases;

a plurality of second circuit means for multiplexing a plurality of bytes from each phase;

a plurality of parallel to serial converting circuits, one of said parallel to serial converting circuits associated with each of said phases, for converting each parallel byte to serial form for transmission on one of a plurality of serial transmission media;

a plurality of serial transmission media;

a plurality of serial to parallel converter circuits, each connected to one of said plurality of said serial transmission media for converting the serial data streams to parallel form;

a plurality of byte synchronization circuits for placing a plurality of bytes for each phase in correct order; and a word synchronization circuit having inputs connected to each of said byte synchronization circuits for assembling said plurality of bytes for each phase into a word and for transmitting each said word to a parallel data bus in synchronized order.

2. A data communication system, according to claim 1, further comprising:

an encoder circuit for encoding said plurality of bytes from each phase into a form suitable for error protection.

3. A data communication system, according to claim 2, further comprising:

a plurality of decoder circuits, each connected to an output of one of said serial to parallel converting circuits for converting said encoded data to original form.

4. A method of transmitting data at an improved bandwidth in a data communication system, comprising the steps of:

dividing an input data signal into a plurality of phases;

multiplexing a plurality of bytes from each phase;

converting each byte to serial form for transmission on one of a plurality of serial transmission media;

converting the serial form of each byte to parallel form;

placing a plurality of bytes for each phase in correct order;

assembling the plurality of bytes for each phase into a word; and transmitting each word to a parallel data bus in synchronized order.

5. A method of transmitting data at an improved bandwidth in a data communication system according to claim 4, further comprising the step of:

encoding the plurality of bytes from each phase into a form suitable for error protection.

6. A method of transmitting data at an improved bandwidth in a data communication system according to claim 5, further comprising the step of:

converting said encoded data to original form.

7. A data transmission system, comprising:

first circuit means for dividing an input data signal into a plurality of phases;

a plurality of second circuit means for multiplexing a plurality of bytes from each phase; and a plurality of parallel to serial converting circuits, one of said parallel to serial converting circuits associated with each of said phases, for converting each parallel byte to serial form for transmission.

8. A data transmission system, according to claim 7, further comprising:

an encoder circuit for encoding each byte of said input data signal into a form suitable for error protection.

* * * * *